(12) United States Patent
Wiser

(10) Patent No.: US 9,999,025 B2
(45) Date of Patent: Jun. 12, 2018

(54) BEACON USING AN FBAR-BASED OSCILLATOR

(71) Applicant: Verily Life Sciences LLC, Mountain View, CA (US)

(72) Inventor: Robert Francis Wiser, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 59 days.

(21) Appl. No.: 15/064,539

(22) Filed: Mar. 8, 2016

(65) Prior Publication Data

US 2017/0265164 A1     Sep. 14, 2017

(51) Int. Cl.
*H04W 72/00*     (2009.01)

(52) U.S. Cl.
CPC .................. *H04W 72/005* (2013.01)

(58) Field of Classification Search
CPC .................................. H04W 72/005
See application file for complete search history.

(56) References Cited

U.S. PATENT DOCUMENTS

| 7,098,573 | B2 | 8/2006 | Stammer |
| 7,215,214 | B1 | 5/2007 | Taheri et al. |
| 9,276,556 | B1 | 3/2016 | Wu et al. |
| 2003/0224747 | A1 | 12/2003 | Anand et al. |
| 2004/0130405 | A1 | 7/2004 | Mohan et al. |
| 2005/0245001 | A1 | 11/2005 | Hyvonen et al. |
| 2007/0296513 | A1 | 12/2007 | Ruile et al. |
| 2010/0302979 | A1 | 12/2010 | Reunamaki |
| 2010/0315138 | A1 | 12/2010 | Namba et al. |
| 2012/0075026 | A1 | 3/2012 | Ruby et al. |

(Continued)

FOREIGN PATENT DOCUMENTS

| EP | 2800341 A1 | 11/2014 |
| KR | 2006083761 A | 7/2006 |
| WO | 2013003753 A2 | 1/2013 |

OTHER PUBLICATIONS

International Search Report dated Mar. 29, 2017 issued in connection with International Application No. PCT/US2016/066296, filed on Dec. 13, 2016, 5 pages.

(Continued)

*Primary Examiner* — Brian D Nguyen
(74) *Attorney, Agent, or Firm* — McDonnell Boehnen Hulbert & Berghoff LLP

(57) ABSTRACT

Methods and systems described herein relate to broadcasting on a wireless channel. An example system includes a sensor and a transceiver coupled to the sensor, the transceiver including: an oscillator circuit including a thin-film bulk acoustic resonator (FBAR), and an antenna. The system also includes a controller with a processor programmed to: broadcast, by the antenna, a first data packet on a wireless channel, where the first data packet is a first packet of a broadcast event; receive, at the antenna, a second data packet transmitted on the wireless channel, where the second data packet is a second packet of the broadcast event; and responsive to receiving the second data packet, perform an action associated with the broadcast event; responsive to the action, transmit, by the antenna, a third data packet on the wireless channel, where the third data packet is a third packet of the broadcast event.

20 Claims, 10 Drawing Sheets

(56) References Cited

U.S. PATENT DOCUMENTS

| | | | |
|---|---|---|---|
| 2012/0195239 A1 | 8/2012 | Belitzer et al. | |
| 2012/0196534 A1 | 8/2012 | Kasslin et al. | |
| 2013/0109313 A1* | 5/2013 | Kneckt | H04W 8/005 455/41.2 |
| 2013/0165044 A1 | 6/2013 | Xie et al. | |
| 2013/0254574 A1 | 9/2013 | Zacchio et al. | |
| 2013/0342285 A1 | 12/2013 | Kadota et al. | |
| 2014/0055243 A1 | 2/2014 | Kerai | |
| 2014/0254466 A1 | 9/2014 | Wurster et al. | |
| 2014/0321321 A1 | 10/2014 | Knaappila | |
| 2014/0335490 A1* | 11/2014 | Baarman | A61B 5/002 434/236 |
| 2015/0011428 A1 | 1/2015 | Cable et al. | |
| 2015/0021721 A1 | 1/2015 | Romig et al. | |
| 2015/0049782 A1* | 2/2015 | Karlquist | G01R 21/02 374/32 |
| 2015/0087255 A1 | 3/2015 | Wentzloff et al. | |
| 2015/0145610 A1* | 5/2015 | Ruby | H03H 9/10 331/107 R |
| 2015/0147067 A1* | 5/2015 | Ryan | H04B 10/116 398/118 |
| 2015/0188491 A1 | 7/2015 | Pancholi et al. | |
| 2015/0308996 A1* | 10/2015 | Kim | G01N 33/0001 73/23.34 |
| 2015/0330869 A1* | 11/2015 | Ziarno | G01M 15/14 701/34.4 |
| 2015/0332258 A1 | 11/2015 | Kurabi et al. | |
| 2016/0021686 A1 | 1/2016 | Kang et al. | |
| 2016/0029148 A1 | 1/2016 | Jackson et al. | |
| 2016/0088438 A1* | 3/2016 | O'Keeffe | H04R 27/00 455/456.2 |
| 2016/0099701 A1* | 4/2016 | Rinaldi | G01J 5/20 422/90 |
| 2016/0105760 A1 | 4/2016 | Wang | |
| 2016/0105761 A1 | 4/2016 | Polo et al. | |
| 2016/0254844 A1 | 9/2016 | Hull et al. | |
| 2016/0287887 A1* | 10/2016 | Wu | A61N 1/37252 |
| 2017/0346516 A1 | 11/2017 | Ripley et al. | |

OTHER PUBLICATIONS

Written Opinion of the International Searching Authority dated Mar. 29, 2017 issued in connection with International Application No. PCT/US2016/066296, filed on Dec. 13, 2016, 10 pages.

nRF8001 Product Specification 1.3—Nordic Semiconductor https://www.nordicsemi.com/kor/content/download/2981/38488/file/nRF8001_PS_v1.3.pdf last accessed Apr. 23, 2017, 217 pages.

Nelson, Andrew et al. "A 22μW, 2.0GHz FBAR oscillator" IEEE Radio Frequency Integrated Circuits Symposium (2011), pp. 1-4.

Paidimarri, Arun et al. "A 2.4 GHz Multi-Channel FBAR-Based Transmitter With an Integrated Pulse-Shaping Power Amplifier." IEEE Journal of Solid-State Circuits (2013), vol. 48(4), pp. 1042-1054.

Otis, Brian Patrick "Ultra-low power wireless technologies for senor networks" Ph.D. Thesis, University of California, Berkeley(Spring, 2005), 181 pages.

Paidimarri, Arun "Architecture for ultra-low power multi-channel transmitters for body area networks using RF resonators" Massachusetts Institute of Technology (Jun. 2011), pp. 1-103.

Chee, Y.H. et al. "An ultra-low power injection locked transmitter for wireless sensor networks" IEE Custom Integrated Circuits Conference (2005), pp. 797-800.

Chee, Y.H. et al. "Ultra low power transmitters for wireless sensor networks" Electrical Engineering and Computer Sciences University of California at Berkeley (May 15, 2006), 140 pages.

Otis, B.P. et al., "An ultra-low power MEMS-based two-channel transceiver for wireless sensor networks" Department of Electrical Engineering and Computer Science University of California, Berkeley (2004), pp. 1-4.

Hu, Julie R. et al., "A 1.56 GHz Wide-Tuning All Digital FBAR-Based PLL in 0.13 um CMOS", Department of Electrical Engineering, University of Washington, Seattle, Washington (2010), pp. 1-4.

Sankaragomathi, Kannan A., "A +/− 3ppm 1.1mW FBAR Frequency Reference with 750 MHz Output and 750mV Supply" University of Washington, Seattle, 3 pages.

Thirunarayanan, Raghavasimhan, "Reducing Energy Dissipation in ULP Systems: PLL-Free FBAR-Based Fast Startup Transmitters", IEEE Transactions on Microwave Theory and Techniques, vol. 63, No. 4, Apr. 2015, pp. 1110-1117.

Written Opinion of the International Searching Authority dated Jun. 23, 2017 issued in connection with International Application No. PCT/US2017/029164, filed on Apr. 24, 2017, 9 pages.

International Search Report dated Jun. 23, 2017 issued in connection with International Application No. PCT/US2017/029164, filed on Apr. 24, 2017, 4 pages.

Written Opinion of the International Searching Authority dated May 19, 2017 issued in connection with International Application No. PCT/US2017/021423, filed on Mar. 8, 2017,9 pages.

International Search Report dated May 19, 2017 issued in connection with International Application No. PCT/US2017/021423, filed on Mar. 8, 2017,4 pages.

* cited by examiner

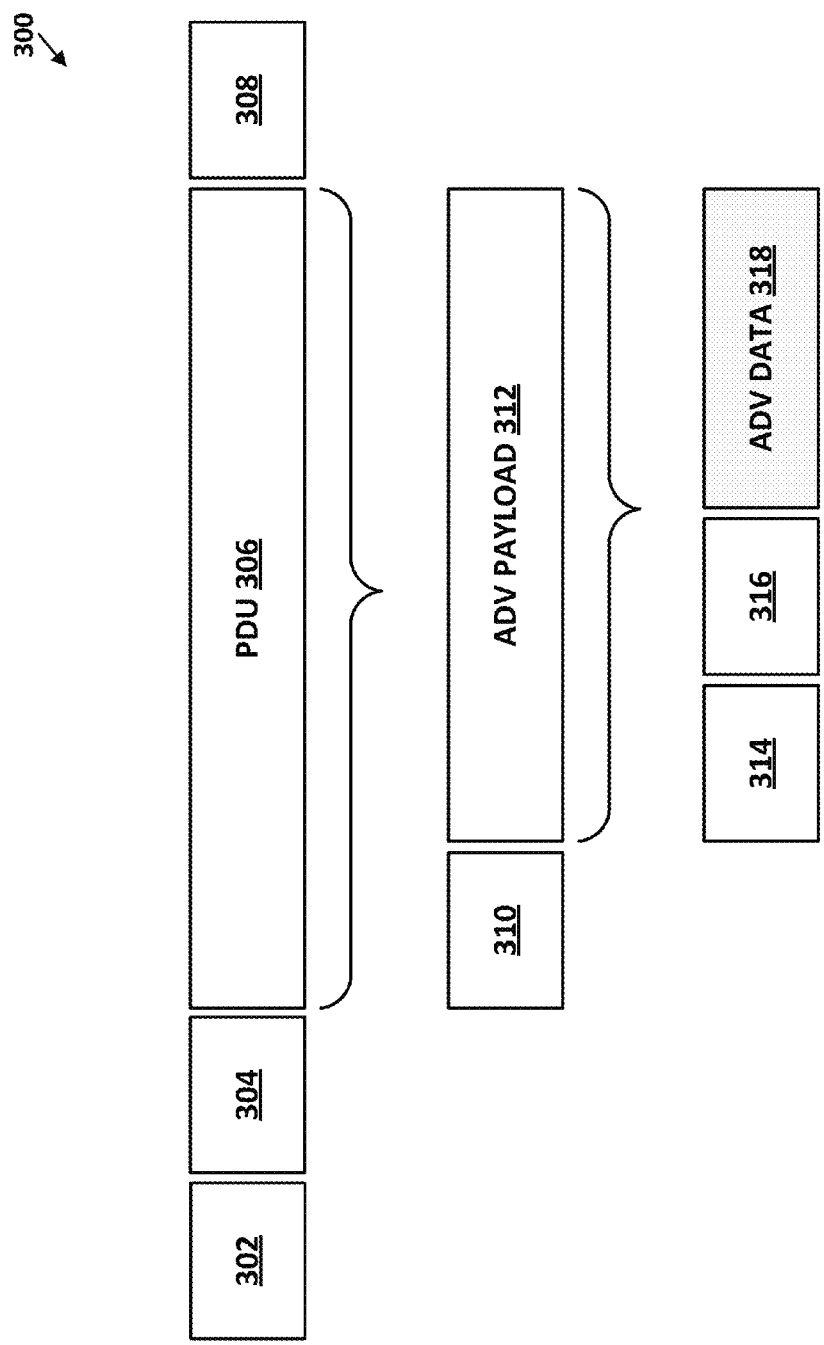

BEACON USING AN FBAR-BASED OSCILLATOR

BACKGROUND

Unless otherwise indicated herein, the materials described in this section are not prior art to the claims in this application and are not admitted to be prior art by inclusion in this section.

Portable computing devices, such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to audio speakers and a microphone of a motor vehicle, possibly allowing for hands-free use of the phone while operating the vehicle. Thus, numerous applications have allowed Bluetooth to grow as the standard wire-replacement protocol. In multiple applications, Bluetooth remains particularly attractive due to its low-cost solutions and protocols designed for low power consumption.

SUMMARY

In one example, a system is provided. The system includes a sensor; a transceiver coupled to the sensor, the transceiver including: an oscillator circuit comprising a thin-film bulk acoustic resonator (FBAR); and an antenna; a controller comprising a processor programmed to: broadcast, by the antenna, a first data packet on a wireless channel, where the first data packet is a first packet of a broadcast event; receive, at the antenna, a second data packet transmitted on the wireless channel, where the second data packet is a second packet of the broadcast event; and responsive to receiving the second data packet, perform an action associated with the broadcast event; responsive to the action, transmit, by the antenna, a third data packet on the wireless channel, where the third data packet is a third packet of the broadcast event.

In another example, a method is provided. The method includes broadcasting, by an antenna of a transceiver, a first data packet on a wireless channel, where the transceiver includes an oscillator circuit, where the oscillator circuit includes a thin-film bulk acoustic resonator (FBAR), and where the first data packet is a first packet of a broadcast event; receiving, at the antenna of the transceiver, a second data packet transmitted on the wireless channel, where the second data packet is a second packet of the broadcast event; responsive to receiving the second data packet, performing an action associated with the broadcast event; and based on the action, transmitting, by the antenna, a third data packet on the wireless channel, where the third data packet is a third packet of the broadcast event.

In yet another example, a system is provided. The system includes a transceiver coupled to the sensor, the transceiver includes: at least one Pierce oscillator circuit comprising a thin-film bulk acoustic resonator (FBAR); an antenna; a controller including a processor programmed to: broadcast, by the antenna, a first data packet on at least one wireless channel, where the first data packet is a first packet of a broadcast event; receive, at the antenna, a second data packet transmitted on the at least one wireless channel, where the second data packet is a second packet of the broadcast event; responsive to receiving the second data packet, perform an action associated with the broadcast event; and responsive to the action, transmit, by the antenna, a third data packet on the at least wireless channel, where the third data packet is a third packet of the broadcast event.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 3 illustrates an advertisement packet, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Note that while the signals described herein are generally referred to as conforming to the Bluetooth core specification, one of ordinary skill in the art would understand that the signals described herein need not conform to the Bluetooth core specification. Also, while the devices disclosed herein are generally referred to as Bluetooth or Bluetooth Low Energy devices, one of ordinary skill in the art would understand that the devices disclosed herein may be used to generate, transmit, and receive signals that do not conform to the Bluetooth core specification.

The terms "advertisement packet," "advertisement channel," and "advertisement event" are disclosed herein to describe several embodiments. Note that these terms are terms of art described in the Bluetooth core specification.

I. Overview

As noted, Bluetooth continues to grow as the standard wire-replacement protocol, and remains particularly attractive due to its protocols designed for low power consumption. Specifically, Bluetooth Low Energy (BLE), an extension of Bluetooth technology, may be attractive in applications where low power consumption may be advantageous.

In particular, BLE provides protocols for low power devices to communicate with multiple other devices. For example, consider a device that can be powered by one or more batteries. Further, consider that the device may be used in an application where replacing or recharging the one or more batteries may not be easily achievable. Accordingly, the device may be a low power device to preserve the charge of its power source. As such, the device may utilize BLE's protocols for communicating with other devices, such as computing devices (e.g., phones, laptops, and wearable computing devices). In an example, the low power device, e.g., a sensor, may utilize BLE protocols to transmit data (e.g., sensor data) to a computing device.

Figure 1:
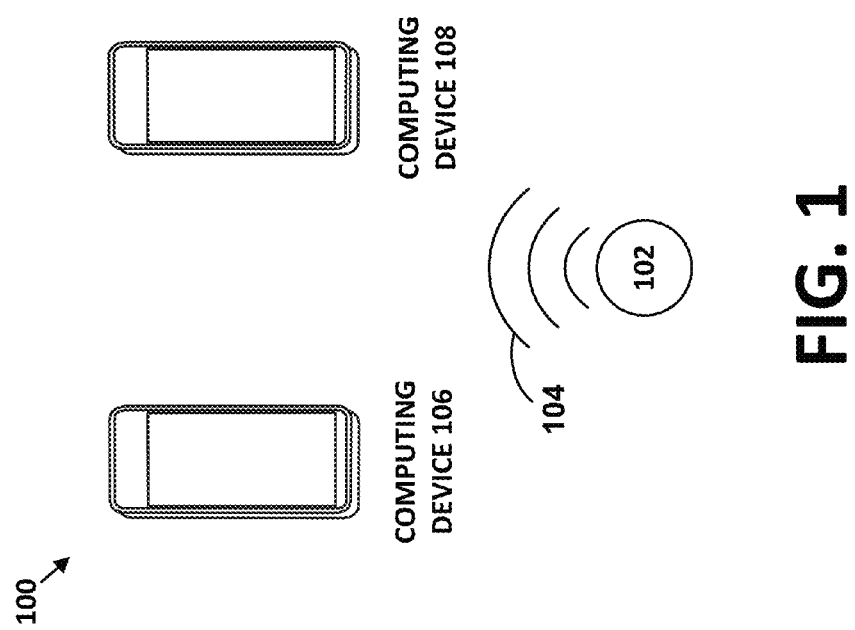
FIG. 1 illustrates computing devices located in proximity to a beacon, in accordance with an example embodiment.

FIG. 1 illustrates an example scenario 100 of a device utilizing BLE protocols. The BLE protocols may be carried out by a low power device 102 (also referred to herein as a "beacon"), which may include a sensor. More specifically, the beacon 102 may include a BLE device or module, which may transmit and/or receive a signal 104 according to BLE protocols. The power source of a BLE device may be one or more batteries. In some examples, the one or more batteries may be the one or more batteries of the beacon 102 in which the BLE device is incorporated. Further, the beacon 102 may transmit, according to BLE protocols, the signal 104 to the computing devices 106 and 108. However, it should be understood that the arrangement for the beacon 102 provided in FIG. 1 is for purposes of illustration only. For example, the beacon 102 may be included in any device, such as a phone (i.e., computing device), a digital television, a monitor, a tablet computer, wearable computing devices, and/or a human-interface device, among other possibilities. Further, in some embodiments, the beacon 102 may transmit a signal 104 to more than or fewer than two computing devices.

In scenario 100, each of the computing devices 106 and 108 may include a Bluetooth module, which may perform a Bluetooth scan to search for other Bluetooth devices and/or for signals from Bluetooth devices. In some embodiments, the computing devices 106 and 108 may scan for Bluetooth devices in order to pair with a Bluetooth device that is within a range of the Bluetooth scan of the computing devices. In other embodiments, at least one of the computing devices 106 and 108 may receive a signal from a Bluetooth device without pairing with the Bluetooth device. For example, at least one of the computing devices may receive a Bluetooth signal, e.g., signal 104, from the beacon 102 without pairing with the beacon 102.

Furthermore, scenario 100 may be a scenario where low power consumption by the beacon 102 is desirable. For example, the power source of the beacon 102 may have limited charge. In such a scenario, low power consumption by the beacon 102 may be desirable to extend the life of the power source. Generally, the power consumption of a BLE device may be governed by the configuration of the BLE device and/or the hardware of the BLE device. Accordingly, the BLE devices disclosed herein may be described in relation to at least decreasing power consumption.

II. Example Systems and Methods

Figure 2:
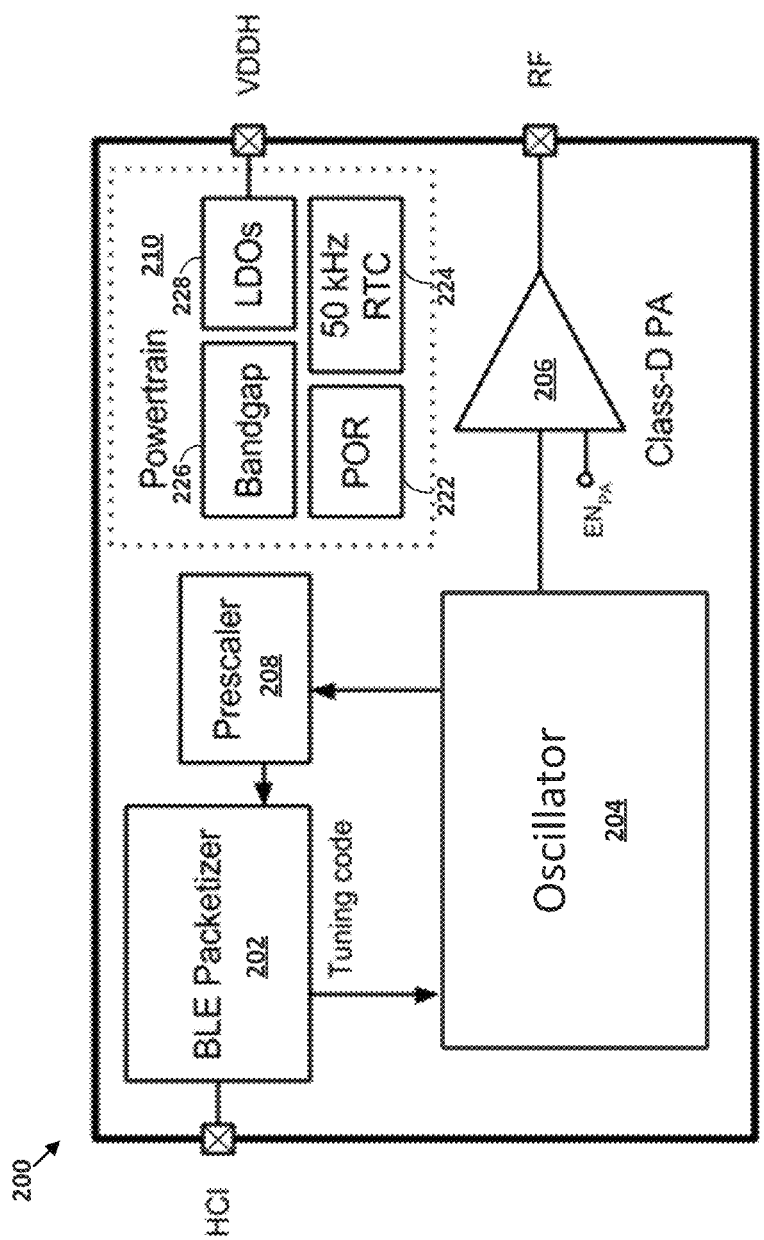
FIG. 2 is a schematic diagram of a transmitter, in accordance with an example embodiment.

FIG. 2 schematically illustrates a BLE transmitter 200, according to an example embodiment. In some embodiments, the BLE transmitter 200 may be included in other devices as a Bluetooth module. For instance, a BLE module may be included in or coupled with the beacon 102 in scenario 100. A device, such as beacon 102, that includes a BLE module may be referred to as a "host device." Accordingly, a BLE module may receive instructions from a processor and/or a memory of a host device. A controller of a BLE module may interface with the host stack of its host device via a Host Controller Interface (HCI). For example, the BLE transmitter 200 may receive a signal via the HCI, which may include data that may be transmitted by the BLE transmitter 200. In some embodiments, the host stack and the controller of a BLE module may be implemented on different processors. In other embodiments, the host stack and the controller of a BLE module may be implemented on the same processor.

As illustrated in FIG. 2, the BLE transmitter 200 may include a BLE packetizer 202, an oscillator 204, a powertrain 210, and an amplifier 206. The BLE transmitter 200 may also include an antenna (not illustrated in FIG. 2). These components, as described herein, may be used to transmit a signal 104 from the BLE transmitter 200. Accordingly, in some embodiments, a BLE module includes only BLE transmitter 200. Such a BLE module may operate solely as a transmitter (also referred to herein as a "broadcaster"). For instance, in scenario 100, the beacon 102, using the BLE transmitter 200, may transmit a signal, which may be received by the computing devices 106 and 108, without pairing with or receiving a signal from the computing devices.

In other embodiments, the BLE transmitter 200 may operate as a transmitter of a transceiver BLE device. A transceiver BLE device may include components that may be used to transmit and receive a signal. For instance, the transceiver may include, along with the transmitter 200's components illustrated in FIG. 2, a low-noise amplifier (LNA), a mixer (e.g., I/Q mixer), a local oscillator (LO), a variable gain amplifier, filters (e.g., baseband filter), and an analog-digital-converter (ADC). The transceiver may also include an antenna that may be used to transmit and receive signals. For instance, in scenario 100, the beacon 102, using a BLE transceiver, may transmit a signal, which may be received by the computing devices 106 and 108. The beacon 102 may also receive a signal from the computing devices 106 and 108.

Returning to FIG. 2, the BLE packetizer 202 may receive a signal via the HCI. As explained elsewhere herein, the signal may originate from a processor of a host device. Further, the received signal may include data that may be included in the signal transmitted by the BLE transmitter 200. The received signal may also include data indicative of a configuration of the BLE module. For example, the received signal may include parameters, such as encryption parameters, modulation parameters, a mode of operation of the BLE module, packet type, etc. The received parameters may be used to configure the BLE module to generate a signal, which may be transmitted by the antenna.

For instance, the signal received via the HCI may be indicative of a mode of operation of the BLE module. Within examples, the mode of operation may depend on the functionality of the BLE module. In some embodiments, the functionality of a BLE module may be predetermined and fixed, as the BLE module may be used in a single application. In other instances, a user may provide an input indicative of the mode of operation to the host computing device. In particular, the user may provide an input to an input/output function of the computing device, possibly a graphical user-interface (GUI), to specify the mode of operation.

In embodiments, a mode of operation of the BLE module may be an advertising mode in which a BLE advertising protocol is used to periodically broadcast data packets referred to as advertising packets (also referred to herein as "advertisement packets"). The advertising packets may carry data indicative of the BLE module (e.g., a unique identifier). Alternatively or additionally, advertising packets may carry data indicative of or information from the host device. For example, the host device may use advertising packets to "advertise" its presence, possibly to "pair" or connect with another device.

In another example, a BLE module may use advertising packets to advertise data, such as geographical data, which may have been stored in a memory of its host device. In an example, the beacon 102 may be used in scenario 100 as a location beacon. Thus, the beacon 102 may use a BLE module to broadcast a signal that may provide one of the computing devices with precise geographical information. In yet other examples, a BLE module may be used to transmit advertising packets, which may include data that may have been collected by the host device. For example, the advertising packets may include meteorological data gathered by a sensor on the host device.

Furthermore, in some instances, the mode of operation of a BLE module may affect its power consumption. For example, a BLE module may decrease its power consumption by using advertising protocols. Advertising protocols may maintain the low power consumption of a BLE module by periodically broadcasting a signal during certain time intervals. During time intervals when a BLE module is not broadcasting a signal, the BLE module may idle in a standby mode. Alternatively, the BLE module may turn off. Accordingly, by turning on only when transmitting a signal in an active transmit mode, a BLE module may decrease its power consumption, which may be advantageous for devices with a finite power source. As such, advertising protocols are designed to allow a BLE module to advertise data to one or more computing devices while maintaining the low power consumption.

Furthermore, BLE protocols include different types of advertising packets. The advertising packet type may at least specify a configuration of a BLE module. For instance, the advertising packet type may specify whether the BLE module is connectable and/or scannable. A connectable BLE module may pair with another Bluetooth device, and a scannable BLE module may transmit a data packet in response to receiving a scan request from another Bluetooth device. Furthermore, an advertising packet may be a directed packet. A directed packet may include a BLE module's address and the receiver device's address, whereas an undirected packet may not be directed toward a particular receiver.

In some embodiments, a BLE module may include only the BLE transmitter 200 and, therefore, may not be able to operate in a connectable configuration. Furthermore, the transmitter 200 may not be able to receive scan requests from other Bluetooth devices. Accordingly, in some embodiments, a BLE module may operate in a non-connectable and non-scannable configuration in order to decrease power consumption. However, in other embodiments, a BLE module may include a transceiver. In such embodiments, the BLE module may operate in a connectable and/or a scannable configuration.

There can be other advantages to the BLE advertising protocols in addition to low power consumption of a BLE module operating in accordance with advertising protocols. For example, in scenario 100, the computing devices 106 and 108 may discover Bluetooth devices located near the computing device faster (and consuming less energy) using advertising protocols than by using other protocols. As described elsewhere herein, advertising protocols may use three fixed channels of a wireless spectrum, e.g., the 2.4 GHz wireless spectrum. Thus, the computing devices 106 and 108 may detect other Bluetooth devices by only scanning the three fixed channels, rather than scanning a broad wireless spectrum, which may allow for receiving and sending BLE advertisement packets faster than other protocols.

Returning to FIG. 2, the BLE packetizer 202 may use the data included in the signal received via the HCI to generate a data signal, which may include one or more data packets. Accordingly, the BLE packetizer 202 may receive instructions to generate a data signal including one or more data packets according to the advertising protocol. Further, the instructions may detail the type of advertising packet to broadcast. For instance, as explained above, the type of advertising packet may determine whether a BLE module is connectable and/or scannable, and/or whether the packet is directed. In an example, the BLE packetizer 202 may receive data indicative of instructions to generate a data signal that includes a non-connectable, non-scannable, and undirected advertising packet. In another example, the BLE packetizer 202 may receive data indicative of instructions to generate a data signal that includes a scannable and undirected advertising packet.

FIG. 3 illustrates an example advertising packet. In particular, an advertising packet 300 may, for example, take the form of any advertising packets described above in relation to the FIG. 1. In some additional embodiments, a Bluetooth tag or a BLE module may communicate the advertisement packet 300. As shown in FIG. 3, advertising packet 300 may include preamble 302, access address 304, payload data unit (PDU) 306 with 2 to 39 bytes, and cyclic redundancy check (CRC) 308.

In addition, PDU 306 may include header 310 and advertisement payload 312 with 6 to 37 bytes. Further, advertisement payload 312 may include header 314, MAC address 316, and advertisement data 318 with up to 31 bytes. In an example, the 31 byte space may contain sensor data that may be communicated via the advertisement packet. The header 314 may include a type of the PDU 306. The type of PDU 306 may specify the type of the advertisement packet. As explained above, the advertisement packet type may be a non-connectable, scannable, and undirected packet type.

Returning to FIG. 2, the oscillator 204 may generate an RF carrier signal that may carry the data signal generated by the BLE packetizer 202. The RF signal carrying the data may then be broadcast by an antenna. As illustrated in FIG. 2, the oscillator 204 may be a free-running oscillator, which may be used to directly generate an RF carrier signal. Thus, a free-running oscillator may replace a frequency synthesizer (e.g., Phase Locked Loop (PLL) synthesizer) to generate an RF carrier signal. Using a free-running oscillator may result in considerable power savings as compared to using a frequency synthesizer, which may be advantageous for low power devices.

Further, both the turn-on time for the frequency synthesizer to lock to its frequency reference and the turn-on time of its frequency reference circuit may be significant compared to the packet duration. Therefore, the turn-on time (i.e., the time to go from sleep mode to active transmit mode) for a transmitter using a frequency synthesizer may be greater than a transmitter using a free-running oscillator. A longer turn-on time may result in greater power dissipation. Accordingly, using the free-running oscillator, which may have a reduced turn-on time compared to a frequency synthesizer, may result in further power savings.

The free-running oscillator may directly generate the RF carrier signal, which may have a frequency within a wireless spectrum, e.g., the 2.4 GHz wireless spectrum. Within examples, the free-running oscillator may directly generate an RF carrier signal that has a frequency of one of the three channels in the 2.4 GHz band that are allocated to BLE advertising protocols according to Bluetooth specifications. The three "advertisement channels" are specified as 1 MHz wide channels with frequencies of 2.402 GHz, 2.480 GHz, and 2.426 GHz.

Note that the example oscillator provided in FIG. 2 and the accompanying description herein is for illustrative purposes only and should not be considered limiting. For instance, the transmitter 200 may include more than one free-running oscillator. In an example, the BLE transmitter 200 may include three free-running oscillators, each of which may be used to generate a carrier signal at a frequency of the three BLE channels. In such examples, the BLE transmitter 200 may utilize methods such as multichannel transmission and frequency hopping.

Within examples, the free-running oscillator 204 may include a Pierce oscillator circuit or a Colpitts oscillator circuit. The oscillator 204 may include a transistor, a biasing resistor, capacitors, and a resonator. The resonator, which may be located off of the IC of the BLE transmitter 200, may be used as a filter to filter the oscillation frequency. Further, the total capacitance of the capacitors in the oscillator 204, as seen by the resonator, may be referred to as the "load capacitance." The load capacitance may affect how far the oscillator loop is resonating, relative to the desired resonant frequency. Accordingly, selectively choosing the resonator, which may have a specific load capacitance requirement, may determine the oscillation frequency.

Within examples, the resonator in the oscillator 204 may be a thin-film bulk acoustic resonator (FBAR). An FBAR resonator may include a piezoelectric thin film between two metal layers. FBAR resonators are high-Q resonators that may have a stable and a low phase-noise center frequency, which may be the oscillation frequency. Within examples, FBAR resonators may have a Q of several hundred. In other examples, FBAR resonators may have an (unloaded) Q of over two thousand. Further, temperature compensation may be used to maintain the center frequency of the FBAR resonator at the frequency of the wireless channel.

Note that the example resonator discussed above is for illustrative purposes only and should not be considered limiting. For instance, the resonator may be any resonator that may be a high frequency resonator, which may provide an oscillation frequency with a stability and an accuracy that may meet Bluetooth standards. In other examples, the resonator may be a crystal resonator. In yet another example, the resonator may be a quartz resonator.

As noted above, the RF carrier signal generated by the oscillator 204 may be used to carry the data signal generated by the BLE packetizer 202. More specifically, the data signal generated by the BLE packetizer 202 may act as a tuning code, which may have a specific symbol rate. Further, the tuning code may be used to directly modulate the RF carrier signal. Accordingly, the modulated RF carrier signal may carry the data signal generated by the BLE packetizer 202. Within examples, the tuning code may modulate the RF carrier signal according to at least BLE protocols.

For instance, BLE protocols specify using Gaussian Frequency Shift Keying (GFSK) as the modulation scheme to modulate the RF carrier signal. Accordingly, the tuning code may be used to modulate the RF carrier signal to two different frequencies of the same advertising channel according to GFSK. Additionally and/or alternatively, the tuning code may be used to modulate the RF carrier signal to two different frequencies of the same advertising channel according to Binary Frequency Shift Keying (BFSK). The oscillator 204 may include a bank of switched capacitors, which may be used to adjust the load capacitance of the oscillator 204. As explained above, adjusting the load capacitance of the oscillator 204 may adjust the oscillation frequency. The digital data signal, indicative of digital "0" and "1," may be used to modify the load capacitance of the oscillator 204, such that the oscillator 204 may generate a modulated signal of two frequencies, one of which corresponds to digital "0" and the other to digital "1."

The modulated RF signal, carrying the data signal, may be transmitted to a class-D power amplifier 206 as illustrated in FIG. 2. However, also note that at least a portion of the modulated signal may be transmitted to a prescaler 208. The prescaler 208 may scale the signal and provide the scaled signal to the BLE packetizer 202, where it may be used as a clock source. For instance, the prescaler 208 may scale down the 2.48 GHz signal to a 1 MHz or 8 MHz signal. By using a portion of the carrier signal as a clock source for the BLE packetizer 202, there may be no need for a separate timing source for the BLE packetizer 202, thereby further increasing power savings.

Furthermore, as illustrated in FIG. 2, the modulated RF carrier signal may be amplified using the class-D power amplifier 206. The amplified signal may then be transmitted to the antenna (represented as "RF" in FIG. 2) where it may be broadcast over the air. As explained above, in some embodiments, a BLE module may be operating in an advertising mode, which involves the BLE module periodically transmitting advertising packets. Accordingly, the broadcast RF signal may include advertisement packets, which may be received by one or more Bluetooth devices.

A BLE module may be powered by the powertrain 210. The powertrain may include a low dropout regulator (LDO) 228, a power on reset (PoR) 222, a bandgap voltage reference (Bandgap) 226, and a real time clock (RTC) 224. Note that the RTC 224 may have a low frequency and may operate without a crystal reference, as the BLE packetizer 202 may use a signal from the oscillator 204 as explained above.

Figure 4A:
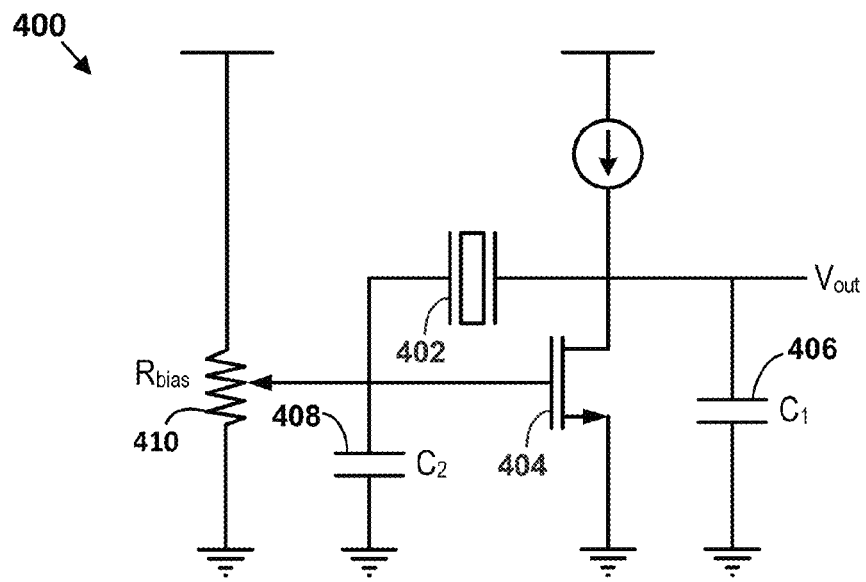
FIG. 4A illustrates an oscillator, in accordance with an example embodiment.
Figure 4B:
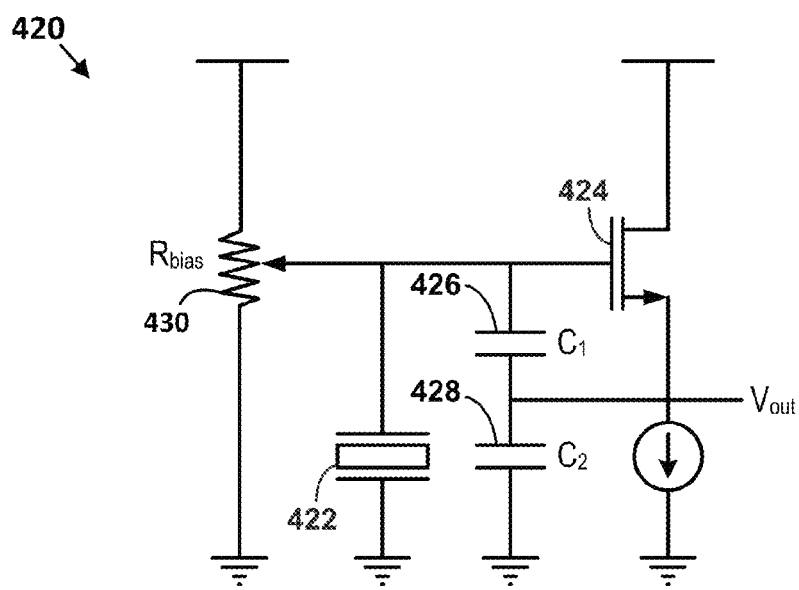
FIG. 4B illustrates an oscillator, in accordance with an example embodiment.

FIGS. 4A and 4B illustrate example oscillator circuits for use in a BLE module. For example, the example oscillator circuits depicted in FIGS. 4A and 4B may serve as oscillator 204 in the BLE transmitter 200 depicted in FIG. 2, which may or may not operate in the connectable configuration (e.g., capable of pairing with another Bluetooth device) and/or the scannable configuration (e.g., broadcasting an advertising packet in response to receiving a scan request from another Bluetooth device).

In particular, FIG. 4A illustrates a Pierce oscillator circuit 400. The Pierce oscillator circuit 400 may include a resonator 402, a transistor 404, capacitors $C_1$ 406 and $C_2$ 408, and a biasing resistor 410. As discussed above with respect to FIG. 2, the resonator 402 may be an FBAR resonator that oscillates at an RF frequency. In other examples, the resonator may be any resonator that may be a high frequency resonator, which may provide an oscillation frequency with a stability and an accuracy that may meet Bluetooth standards, such as a crystal resonator. While the transistor 404 is depicted in FIG. 4A as a metal-oxide-semiconductor field-effect transistor (MOSFET), the transistor 404 may be any type of amplifying transistor. In some examples, the transistor 404 may include more than one transistor and/or may take the form of an operational amplifier.

As depicted in FIG. 4A, a Pierce oscillator circuit includes a pi-network feedback circuit arrangement. In this arrangement, one terminal of the resonator 402 is connected to capacitor $C_1$ 406, and the other terminal of the resonator 402 is connected to capacitor $C_2$ 408, while capacitors $C_1$ 406 and $C_2$ 408 are coupled to ground. In operation, the FBAR resonator 402 may appear inductive at frequencies different from its resonant frequency, and the oscillation frequency of the FBAR resonator 402 may be adjusted by varying its load capacitance. Accordingly, by varying the capacitance of capacitors $C_1$ 406 and $C_2$ 408 the load capacitance of the FBAR resonator 402 may be varied, and, consequently, the oscillation frequency of the Pierce oscillator circuit 400 may be varied as well.

As noted above with respect to FIG. 2, the data signal generated by the BLE packetizer 202 may act as a tuning code that may be used to directly modulate an RF signal generated by the Pierce oscillator circuit 400, such that the modulated RF signal may carry the data signal generated by the BLE packetizer 202. Within examples, the tuning code may modulate the RF signal generated by the Pierce oscillator circuit 400 according to at least BLE protocols.

For instance, the tuning code may be used to modulate the RF signal to two different frequencies of the same advertising channel according to GFSK. Additionally and/or alternatively, the tuning code may be used to modulate the RF signal to two different frequencies of the same advertising channel according to BFSK. In some examples, the capacitors $C_1$ 406 and $C_2$ 408 may include a bank of switched capacitors, which may be used to adjust the load capacitance of the FBAR resonator 402. As explained above, adjusting the load capacitance of the FBAR resonator 402 may adjust the oscillation frequency of the Pierce oscillator circuit 400. The digital data signal, indicative of digital "0" and "1," may be used to modify the load capacitance of the FBAR resonator 402, such that the Pierce oscillator circuit 400 may generate a modulated signal of two frequencies, one of which corresponds to digital "0" and the other to digital "1."

FIG. 4B illustrates a Colpitts oscillator circuit 420. Similar to the Pierce oscillator circuit 400, the Colpitts oscillator circuit 420 may include a resonator 422, a transistor 424, capacitors $C_1$ 426 and $C_2$ 428, and a biasing resistor 430. As discussed above with respect to FIG. 2, the resonator 422 may be an FBAR resonator that oscillates at an RF frequency. In other examples, the resonator may be any resonator that may be a high frequency resonator, which may provide an oscillation frequency with a stability and an accuracy that may meet Bluetooth standards, such as a crystal resonator. While the transistor 424 is depicted in FIG. 4B as a MOSFET, the transistor 424 may be any type of amplifying transistor. In some examples, the transistor 424 may include more than one transistor and/or may take the form of an operational amplifier.

As depicted in FIG. 4B, a Colpitts oscillator circuit 420 includes a capacitive voltage divider feedback circuit arrangement. In this arrangement, capacitors $C_1$ 426 and $C_2$ 428 are coupled in series to form a voltage divider. One terminal of the resonator 422 is connected to the transistor 424, and the other terminal of the resonator 422 is connected to ground. In operation, the FBAR resonator 422 may appear inductive at frequencies different from its resonant frequency, and the oscillation frequency of the FBAR resonator 422 may be adjusted by varying its load capacitance. Accordingly, by varying the capacitance of capacitors $C_1$ 426 and $C_2$ 428 the load capacitance of the FBAR resonator 422 may be varied, and, consequently, the oscillation frequency of the Colpitts oscillator circuit 420 may be varied as well.

As noted above with respect to FIG. 2, the data signal generated by the BLE packetizer 202 may act as a tuning code that may be used to directly modulate an RF signal generated by the Colpitts oscillator circuit 420, such that the modulated RF signal may carry the data signal generated by the BLE packetizer 202. Within examples, the tuning code may modulate the RF signal generated by the Colpitts oscillator circuit 420 according to at least BLE protocols.

For instance, the tuning code may be used to modulate the RF signal to two different frequencies of the same advertising channel according to GFSK. Additionally and/or alternatively, the tuning code may be used to modulate the RF signal to two different frequencies of the same advertising channel according to BFSK. In some examples, the capacitors $C_1$ 426 and $C_2$ 428 may include a bank of switched capacitors, which may be used to adjust the load capacitance of the FBAR resonator 422. As explained above, adjusting the load capacitance of the FBAR resonator 422 may adjust the oscillation frequency of the Colpitts oscillator circuit 420. The digital data signal, indicative of digital "0" and "1," may be used to modify the load capacitance of the FBAR resonator 422, such that the Colpitts oscillator circuit 420 may generate a modulated signal of two frequencies, one of which corresponds to digital "0" and the other to digital "1."

Note that the example oscillator circuits provided in FIGS. 4A and 4B and the accompanying description herein is for illustrative purposes only and should not be considered limiting. For instance, the oscillator circuits may include additional and/or alternative components than depicted. Further, Pierce and Colpitts oscillator circuits may take various forms, and the BLE devices described herein should not be limited to the depicted oscillator circuit configurations. For example, in some embodiments, the Colpitts oscillator circuit 420 may include a bipolar junction transistor (BJT) arranged in a common base configuration.

In some examples, an oscillator, such as oscillator 204 of BLE transmitter 200 depicted in FIG. 2, may include three Pierce oscillator circuits 400, each of which may be used to generate a carrier signal at a frequency of one of the three BLE channels. In some examples, an oscillator, such as oscillator 204 of BLE transmitter 200 depicted in FIG. 2, may include three Colpitts oscillator circuits 420, each of which may be used to generate a carrier signal at a frequency of one of the three BLE channels.

Still in other examples where the BLE transmitter 200 includes more than one of the Pierce oscillator circuits 400 or Colpitts oscillator circuits 420, the BLE transmitter 200 may employ time division multiplexing (TDM) to modulate the RF carrier signals generated by the Pierce oscillator circuits 400 or Colpitts oscillator circuits 420 to carry the data signal generated by the BLE packetizer 202. In this manner, the data signal generated by the BLE packetizer 202 may be carried on a first RF signal (e.g., a 2.402 GHz signal) for a given amount of time, then carried on a second RF signal (e.g., a 2.480 GHz signal) for a given amount of time, and then carried on a third RF signal (e.g., a 2.426 GHz signal) for a given amount of time. Note that, in some examples, TDM may be used to carry the data signal on more or fewer than three RF signals.

Figure 5A:
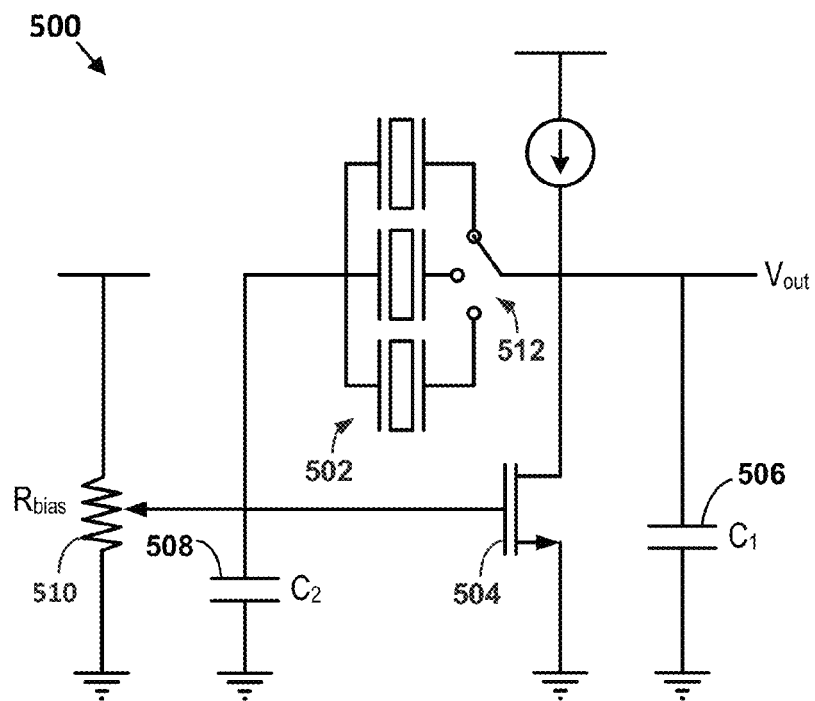
FIG. 5A illustrates an oscillator, in accordance with an example embodiment.
Figure 5B:
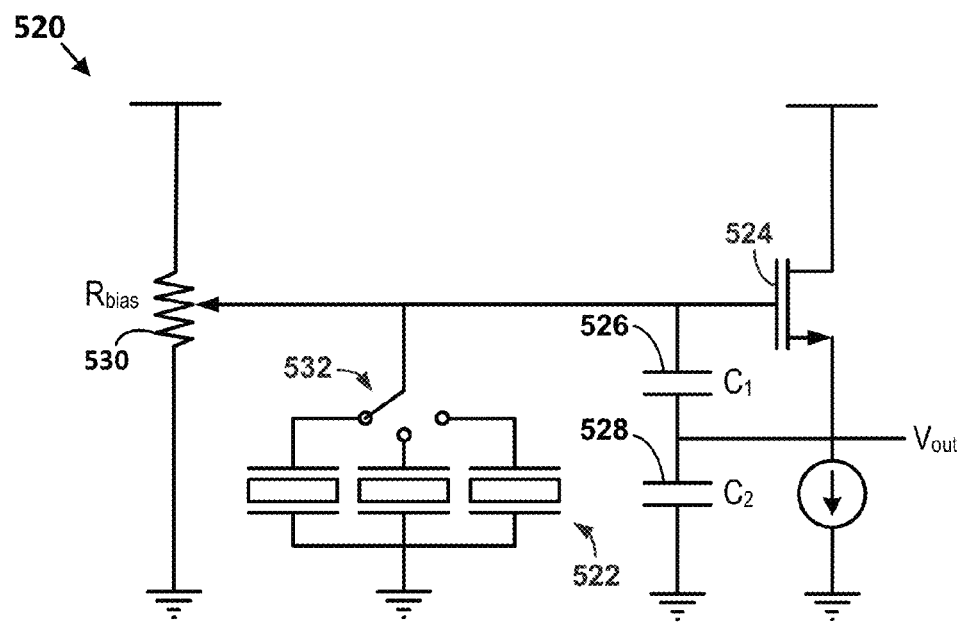
FIG. 5B illustrates an oscillator, in accordance with an example embodiment.

As noted, reducing the size and power consumption of a BLE module allows for longer operation and more versatile applications and/or uses. Accordingly, it may be advantageous to generate multiple carrier signals with a single oscillator circuit. FIGS. 5A and 5B depict example oscillator circuits that produce multiple carrier signals for use in a BLE device. In some examples, the oscillator circuits depicted in FIGS. 5A and 5B may serve as oscillator 204 in the BLE transmitter 200 depicted in FIG. 2, which may or may not operate in the connectable configuration (e.g., capable of pairing with another Bluetooth device) and/or the scannable configuration (e.g., broadcasting an advertising packet in response to receiving a scan request from another Bluetooth device).

FIG. 5A illustrates a Pierce oscillator circuit 500. Like the Pierce oscillator circuit 400 depicted in FIG. 4A, Pierce oscillator circuit 500 may include a transistor 504, capacitors $C_1$ 506 and $C_2$ 508, and a biasing resistor 510. However, rather than including a single resonator, the Pierce oscillator circuit 500 may include a number of resonators 502. The resonators 502 may be FBAR resonators or high frequency resonator that may provide an oscillation frequency with a stability and an accuracy that may meet Bluetooth standards, such as crystal resonators.

As depicted in FIG. 5A, the Pierce oscillator circuit 500 includes three resonators 502. Each of the three resonators 502 may respectively oscillate at one of the frequencies of the three BLE channels. Note that, in other examples, the Pierce oscillator circuit 500 may include more or fewer than three resonators, and the resonators may oscillate at various frequencies.

In operation, a switch 512 may toggle between terminals of the resonators 502, such that only one of the resonators 502 is connected to the Pierce oscillator circuit 500 at any given time. As illustrated in FIG. 5A, the switch 512 may connect a terminal on one side of the resonators 502 to capacitor $C_1$ 506 while the terminals on the other side of the resonators remain coupled to capacitor $C_2$ 508. In another example, the switch 512 may connect a terminal on one side of the resonators 502 to capacitor $C_2$ 508 while the terminals on the other side of the resonators remain coupled to capacitor $C_1$ 506. In another example, the switch 512 may connect a terminal on one side of the resonators 502 to capacitor $C_1$ 506 and a terminal on the other side of the resonators 502 to capacitor $C_2$ 508. The switch 512 may have a low resistance to minimize power loss and performance degradation of the Pierce oscillator circuit 500. Further, the switch 512 may have a low capacitance to minimize capacitive loading of the resonators 502.

In some examples, a BLE module, such as the BLE transmitter 200 illustrated in FIG. 2, may employ time division multiplexing when toggling the switch 512. In this manner, the Pierce oscillator circuit 500 may generate a first RF signal with one of the resonators 502 for a given period of time, a second RF signal with another one of the resonators 502 for a given period of time, and a third RF signal with yet another one of the resonators 502 for a given period of time. In some examples, each of these three RF signals may have a respective frequency within the three respective BLE channels. Further, each of these RF signals may be modulated by the data signal generated by the BLE packetizer 202, amplified by the amplifier 206, and broadcast over the air. In other examples, time division multiplexing may be used similarly to select between more or fewer than three RF signals.

FIG. 5B illustrates a Colpitts oscillator circuit 520. Like the Colpitts oscillator circuit 420 depicted in FIG. 4B, Colpitts oscillator circuit 520 may include a transistor 524, capacitors $C_1$ 526 and $C_2$ 528, and a biasing resistor 530. However, rather than including a single resonator, the Colpitts oscillator circuit 520 may include a number of resonators 522. The resonators 522 may be FBAR resonators or high frequency resonator that may provide an oscillation frequency with a stability and an accuracy that may meet Bluetooth standards, such as crystal resonators.

As depicted in FIG. 5B, the Colpitts oscillator circuit 520 includes three resonators 522. Each of the three resonators 522 may respectively oscillate at one of the frequencies of the three BLE channels. In some examples, the Colpitts oscillator circuit 520 may include more or fewer than three resonators, and the resonators may oscillate at various frequencies.

In operation, a switch 532 may toggle between terminals of the resonators 522, such that only one of the resonators 522 is connected to the Colpitts oscillator circuit 520 at any given time. As illustrated in FIG. 5B, the switch 532 may connect a terminal on one side of the resonators 522 to the transistor 524 while the terminals on the other side of the resonators remain coupled to ground. In another example, the switch 532 may connect a terminal on one side of the resonators 522 to ground while the terminals on the other side of the resonators remain coupled to the transistor 524. In another example, the switch 532 may connect a terminal on one side of the resonators 522 to the transistor 524 and a terminal on the other side of the resonators 522 to ground. The switch 532 may have a low resistance to minimize power loss and performance degradation of the Colpitts oscillator circuit 520. Further, the switch 532 may have a low capacitance to minimize capacitive loading of the resonators 522.

In some examples, a BLE module, such as the BLE transmitter 200 illustrated in FIG. 2, may employ time division multiplexing when toggling the switch 532. In this manner, the Colpitts oscillator circuit 520 may generate a first RF signal with one of the resonators 522 for a given period of time, a second RF signal with another one of the resonators 522 for a given period of time, and a third RF signal with yet another one of the resonators 522 for a given period of time. In some examples, each of these three RF signals may have a respective frequency within the three respective BLE channels. Further, each of these RF signals may be modulated by the data signal generated by the BLE packetizer 202, amplified by the amplifier 206, and broadcast over the air. In other examples, time division multiplexing may be used similarly to select between more or fewer than three RF signals.

As noted previously, the resonator or resonators of the oscillator 204 may be located on a separate IC from the oscillator 204. In order to further reduce the size of a BLE module, multiple resonators may be fabricated on a single die.

Figure 6:
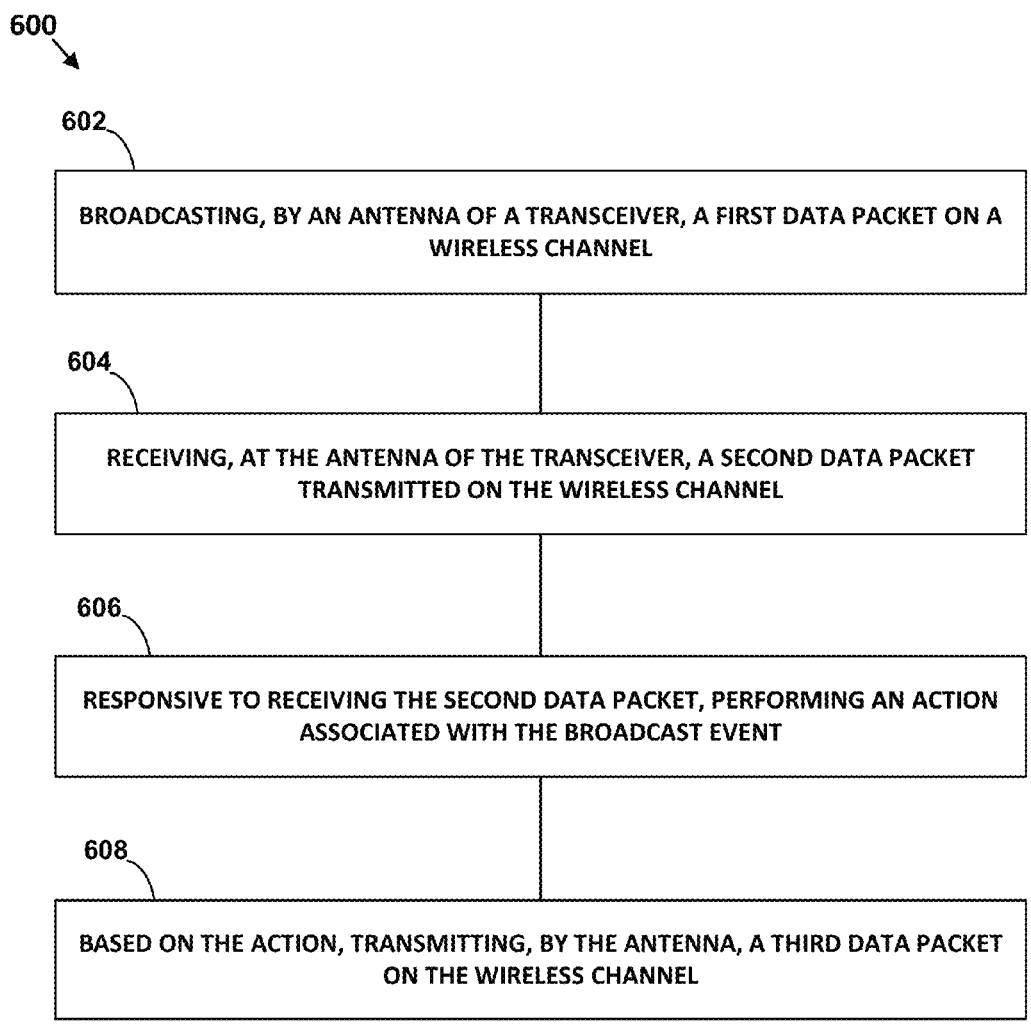
FIG. 6 is a flow diagram of a method, in accordance with an example embodiment.

FIG. 6 illustrates a flow diagram of a method 600 for broadcasting an advertisement event on a wireless channel, according to an example embodiment. In particular, the method 600 of FIG. 6 may be carried out or implemented by one or more of devices, such as the Bluetooth devices described herein. For example, the method 600 may be carried out by the beacon 102 in FIG. 1 to communicate with computing devices 106 and 108. The beacon 102 may include a BLE transceiver that includes the BLE transmitter 200. In some examples, the beacon 102 may also include a sensor. Within examples, the oscillator circuit of the BLE transmitter 200 may be one or more of the oscillator circuits described in relation to FIGS. 4A, 4B, 5A, and 5B. Accordingly, one or more Pierce oscillator circuits with one or more FBAR resonators, or one or more Colpitts oscillator circuits with one or more FBAR resonators, may directly generate the RF signals.

Further, the method 600 may include one or more steps, processes, and/or functions as illustrated by one or more of blocks 602 through 608. Although the blocks are illustrated in a sequential order, a number of these blocks may also be performed simultaneously and/or in a different order than those illustrated. Also, the various blocks may be combined into fewer blocks, divided into additional blocks, and/or removed based upon specific implementations. Also, although the method 600 is described herein as being carried out by a BLE beacon using BLE protocols, the method may also be carried out by other devices using other protocols.

At block 602, the method 600 includes broadcasting, by an antenna of a transceiver, a first data packet on a wireless channel. The transceiver may be a BLE module of a host device, such as the beacon 102. In such an embodiment, a controller of the transceiver may receive a signal from the host stack of the beacon 102. For example, the controller may receive a signal from the host stack via an HCI. The received signal may be indicative of a configuration of the beacon 102 and may include data that may be included in a first data packet that the beacon 102 generates.

In an embodiment, the first data packet may be a first packet of a broadcast event. As explained above, the beacon 102 may periodically turn on to broadcast data packets. A broadcast event includes the data packets that a beacon may broadcast during a time interval in which the beacon is on. Accordingly, the beacon 102 may periodically broadcast a broadcast event including one or more packets. The time interval between two broadcast events may be referred to as a "broadcast interval." The beacon 102 may idle/sleep or turn off during each broadcast interval. In some examples, broadcast interval may be the same between all broadcast events that are broadcast. In other examples, a pseudo-random delay may be added to the broadcast interval between broadcast events. The broadcast interval may be any time period on the order of minutes, seconds, milliseconds, microseconds, etc. For example, the broadcast interval may be 10 milliseconds.

In some examples, a beacon that includes more than one FBAR oscillator, may broadcast a data packet on more than one wireless channel. A broadcast event of such a beacon may include data packets that are broadcast on more than one wireless channel. In the context of BLE protocols, a broadcast event may be referred to as an "advertisement event" and a broadcast interval as an "advertisement interval." Further, in the context of BLE protocols, a wireless channel onto which an advertisement event is broadcast may have a frequency of 2.402 GHz, 2.480 GHz, and 2.426 GHz.

Figure 7:
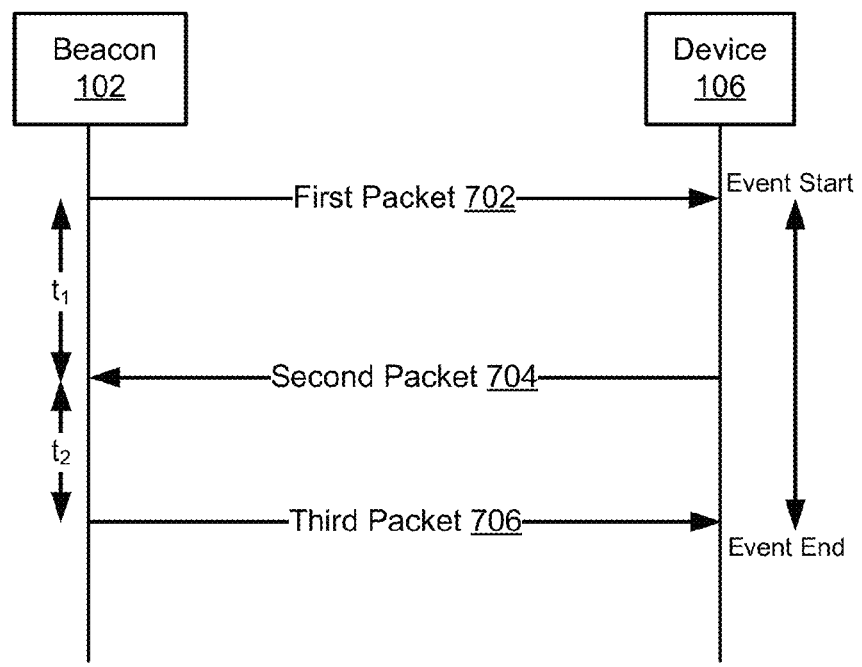
FIG. 7 illustrates a broadcast event, in accordance with an example embodiment.

FIG. 7 illustrates a broadcast event, according to an example embodiment. As illustrated in FIG. 7, the beacon 102, may broadcast a first data packet 702 on one of the advertisement channels. Accordingly, the broadcast event may be an advertisement event and the first data packet 702 may be an advertisement packet. Further, the first data packet 702 may be the first packet of the advertisement event. A PDU type of an advertisement packet may specify the type of the advertisement packet and thus the type of the advertisement event. For example, the PDU type may be a scannable undirected advertisement type. A scannable advertisement type indicates that a beacon transmitting the packet may receive a second data packet from a device that received the first data packet. In an example, the PDU type of first data packet 702 is a scannable undirected advertisement type.

Returning to FIG. 6, at block 604, the method 600 further includes receiving, at the antenna of the transceiver, a second data packet transmitted on the wireless channel. As illustrated in FIG. 7, the device 106 may receive the first data packet 702. The device 106, also referred to herein as a "scanner," may include a Bluetooth module. The device 106 may use the Bluetooth module to scan the advertisement channels in order to detect data packets that may be broadcast by beacons, such as beacon 102. The device 106 may determine that the PDU type of the first data packet 702 is a scannable undirected advertisement type. In some examples, the device 106 may not send a data packet in response to receiving the first data packet. In such examples, the first packet 702 may be the sole data packet of the broadcast event.

In other examples, the device 106 may generate and transmit a data packet in response to receiving the first data packet 702. As illustrated in FIG. 7, the device 106 may generate and transmit a second data packet 704. In an example, the device 106 may generate the second data packet 704 to request more information from the beacon 102. The second data packet 704 may be transmitted on the same wireless channel as the first data packet 704. The beacon 102 may remain on for a period of time after transmitting the first data packet 702 in order to scan the wireless channel for the second data packet. The time period during which the beacon remains on may be any time period on the order of seconds, milliseconds, microseconds, etc. The beacon 102 may receive the second data packet 704 after a time period of $t_1$ from broadcasting the first packet 702. For example, $t_1$ may be 150 microseconds. The second data packet 702 may be the second data packet of the advertisement event. In the context of BLE protocols, the second data packet is referred to as a "scan request" packet.

As shown by block 606, the method 600 further includes responsive to receiving the second data packet, performing an action associated with the broadcast event. For example, the second data packet may be indicative of a request for more data from the beacon 102. The beacon 102, responsive to receiving the second data packet, may generate a data packet including the requested data.

At block 608, the method 600 further includes based on the action, transmitting, by the antenna, a third data packet on the wireless channel. As illustrated in FIG. 7, the beacon 102 may transmit the third data packet 706 on the wireless channel on which the first and second packets were broadcast. As explained above, the third data packet 706 may include data requested by the device 106. The beacon 102 may transmit the third data packet 706 after a time period $t_2$ from receiving the second data packet. The time period $t_2$ may be any time period on the order of seconds, milliseconds, microseconds, etc. The third data packet 706 may be the third and final data packet of the advertisement event. In the context of BLE protocols, the third data packet may be referred to as a "scan response" packet.

It should be noted that FIG. 2 may correspond to some of hardware, chipsets, and/or circuitry that are designed or wired to perform the specific logical functions in method 600. Further, each block in method 600 may represent a module, a segment, or a portion of program code, which includes one or more instructions executable by a processor for implementing specific logical functions or steps in the process. The program code may be stored on any type of computer readable medium, for example, such as a storage device including a disk or hard drive.

Figure 8:
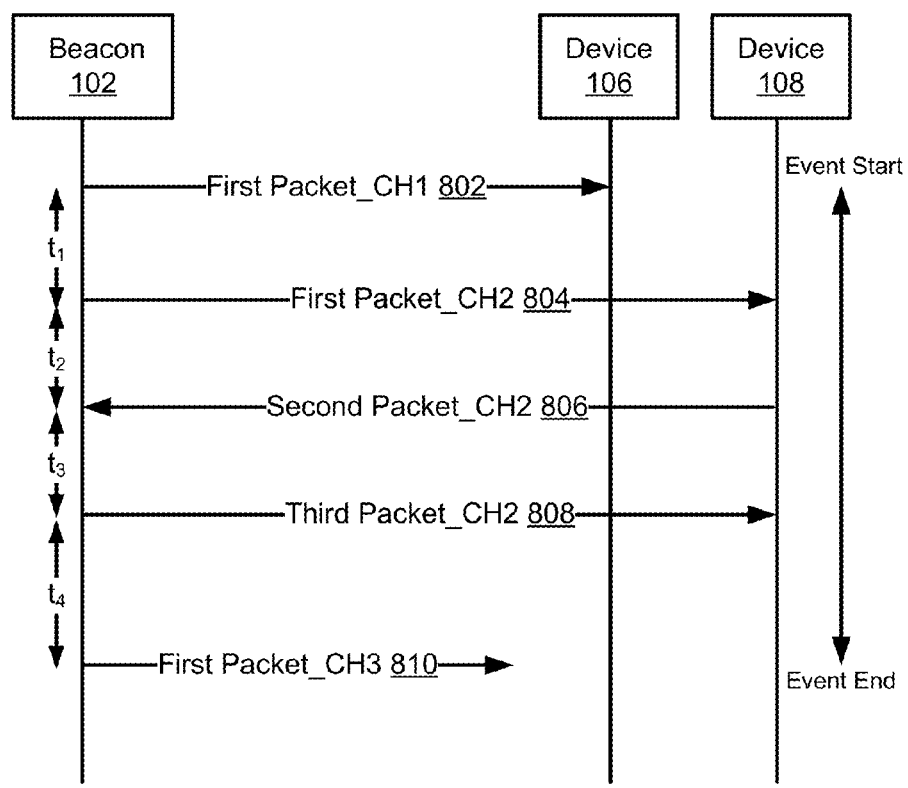
FIG. 8 illustrates a broadcast event, in accordance with an example embodiment.

FIG. 8 illustrates an advertisement event, according to an example embodiment. The advertisement event illustrated in FIG. 8 may include a beacon 102 that may transmit a signal on three wireless channels. For example, the beacon 102 may turn on and transmit the first data packet_CH1 802 on a first advertisement channel CH1. For example, the first advertisement channel may have a frequency of 2.402 GHz. The first data packet 802 may be the first packet of the advertisement event and the first data packet_CH1 802 may be an advertisement packet. The PDU type of the first data packet_CH1 802 may be a scannable undirected advertisement type. The device 106 may be scanning the first advertisement channel CH1. As illustrated in FIG. 8, the device 106 may receive the first data packet_CH1 802. In this example, the device 106 does not generate and transmit a data packet in response to receiving the first data packet_CH1 802.

The beacon 102 may also transmit a data packet, which includes identical or nearly identical information to the first data packet_CH1 802, on a different channel than the channel on which the first data packet 802 was broadcast. For example, the beacon 102 may broadcast a first data packet_CH2 804 on a second advertisement channel CH2. The second advertisement channel may have a frequency of 2.480 GHz. The first data packet_CH2 804, which may be an advertisement packet, may be the second packet of the advertisement event. The PDU type of the first data packet_CH2 804 may be a scannable undirected advertisement type. The device 108 may be scanning the advertisement channel CH2. As illustrated in FIG. 8, the device 108 may receive the first data packet_CH2 804. As the PDU type of the first data packet_CH2 804 is a scannable type, the device 108 may generate and transmit a data packet in response to receiving the first data packet_CH2 804.

For example, the device 108 may generate a second data packet_CH2 806. The device 108 may transmit the second data packet_CH2 806 on the same wireless channel on which the first data packet_CH2 804 was broadcast, which, in this example, is 2.480 GHz. The beacon 102 may be on and scanning the wireless channel CH2 after transmitting the first data packet_CH2 804. Accordingly, the beacon 102 may receive the second data packet_CH2 806 after a time period $t_2$ from transmitting the first data packet_CH2 804. The second data packet_CH2 806 may be a scan request packet and may be the third packet of the advertisement event.

In response to receiving the second data packet_CH2 806, the beacon 102 may perform an action associated with the advertisement event. For example, the advertisement event may be a data transfer event, and the first data packet_CH2 804 may include data stored in the beacon 102, such as sensor data gathered by a sensor of the beacon 102. The second data packet_CH2 may be a request for additional data. Thus, in response to receiving the second data packet_CH2, the beacon 102 may generate a data packet that includes the requested data. Subsequently, the beacon 102 may transmit the generated data packet on the wireless channel CH2. As illustrated in FIG. 8, the generated data packet, may be transmitted to the device 108 as a third data packet_CH2 808. The beacon 102 may transmit the third data packet after a time period $t_4$ from receiving the second data packet_CH2 806. The third data packet_CH2 808 may be a scan response packet and may be the fourth packet of the advertisement event.

Further, the beacon 102 may broadcast a data packet, which includes identical or nearly identical information to the first data packet_CH1 802 and the first data packet_CH2 804, on a different channel than the channels on which the first data packet_CH1 802 and the first data packet_CH2 804 were broadcast. For example, the beacon 102 may broadcast a first data packet_CH3 810 on a third wireless channel CH3. The wireless channel CH3 may be an advertisement channel that has a frequency of 2.426 GHz. The first data packet_CH3 810 may be the fifth and final packet of the advertisement event. As illustrated in FIG. 8, the beacon 102 may transmit the first data packet_CH3 810 after a period of $t_4$ from transmitting the third data packet_CH2 808. The time period $t_4$ may be any time period on the order of seconds, milliseconds, microseconds, etc. In this example, neither the device 106 nor the device 108 is scanning the wireless channel CH3. Thus, the first packet_CH3 810 is not received by either device. The beacon 102 may switch to sleep mode after a period of time from transmitting the first packet_CH3 810. The beacon 102 may remain on for the time period in order to scan the channel CH3 for any possible scan request packets.

The beacon 102 may perform the method 600 to broadcast a broadcast event. Within examples, the broadcast event broadcast by the beacon 102 may be one of a plurality of broadcast event types. The type of event that is broadcast may depend on the application in which the beacon 102 is being used or on the data that is being broadcast by the beacon 102. Alternatively, the type of event may be determined by a user of the device that receives data packets from the beacon 102.

In an embodiment, the broadcast event may be an encrypted data transfer event. An encrypted data transfer event may be used to transmit encrypted data from a first device to a second device. For example, the first device may be a beacon, such as beacon 102, that includes a transceiver. The second device may be a computing device, such as device 106 and device 108. The encrypted data transfer broadcast event may include an exchange of three or more data packets between the first device and the second device. A beacon may broadcast an encrypted data transfer event when the data that the beacon may broadcast is sensitive.

In an example, the beacon 102 may generate a first data packet. The first data packet may be the first packet of the encrypted data transfer event. The first data packet may include encrypted data indicative of the beacon 102. For example, the encrypted data may include a unique identifier of the beacon 102 such as a serial number, a UID, or a MAC address. The beacon 102 may use one or more encryption keys to encrypt the payload data. Further, the beacon 102 may broadcast the first data packet on a wireless channel. For example, the wireless channel may be an advertisement channel that has a frequency of 2.402 GHz, 2.480 GHz, or 2.426 GHz.

The device 106 may be scanning the wireless channel on which the first data packet is transmitted. Accordingly, the device 106 may receive the first data packet. The device 106 may need to decrypt the payload of the first data packet in order to identify the beacon from which the first data packet was sent. The device 106 may use one or more encryption keys to decrypt the data. The device 106 may be decrypt the data if the one or more encryption keys that it uses are identical to the encryption key(s) used by the beacon 102 to encrypt the data. The encryption key(s) may have been previously shared between the devices. For example, the encryption key(s) may be located on an authentication server that the device 106 may access. The server may authenticate that the device 106 may receive the encryption key(s) using an identifier of the device 106 for instance. The device 106 may receive the encryption key(s) from the server if the device 106 has authorization to receive the encryption key(s). In another example, the encryption key(s) may be exchanged between the beacon 102 and the device 106 using a direct wireless connection such near field communication (NFC) or radio frequency identification (RFID). In yet another example, the encryption key(s) may be input manually into the device 106 via a user interface of the device 106.

The device 106 may use the decrypted data from the first data packet to identify the beacon 102. The device 106 may determine whether it may request more data from the beacon 102. If the device 106 determines to request more data, the device 106 may generate a second data packet. The payload of the second data packet may include a response that may be used to confirm its authentication to receive data from the beacon 102. For example, the device 106 may use the shared encryption keys to generate an expected response. The data indicative of the expected response may be encrypted and included in the payload of the second data packet. The device 106 may then transmit the second packet on the same wireless channel on which the first data packet was broadcast.

The beacon 102 may be on and scanning the wireless channel for packets sent in response to the first data packet. Accordingly, the beacon 102 may receive the second data packet sent by the device 106. The beacon 102 may use the shared encryption keys to decrypt the data included in the payload of the second data packet. The beacon 102 may determine whether the expected response included in the second data packet matches a response stored in a memory of the beacon 102. The response stored in the memory of the beacon 102 may be generated using the shared encryption keys. The beacon 102 may determine that the device 106 may receive data from the beacon 102 if the expected response matches the response generated by the beacon 102.

In response to determining that the device 106 may receive data, the beacon 102 may generate a third data packet. The payload of the third data packet may include data, such as sensor data, that may be stored in a memory of the beacon 102. The beacon 102 may use the shared encryption keys to encrypt the payload data. The beacon 102 may transmit the third data packet on the same wireless channel on which the first and second data packets were transmitted. The device 106 may receive the third data packet. The device 106 may also decrypt the encrypted payload data of the third data packet. The third data packet may be the third and final packet of the advertisement event. The beacon 102 may turn off or switch to sleep mode after transmitting the third data packet.

In another embodiment, the broadcast event may be a state transition event. A state transition event may be used to change a state of a first device by sending an instruction from a second device. For example, the first device may be a beacon, such as beacon 102, that includes a transceiver and a sensor. The second device may be a computing device, such as device 106 or device 108. The state transition broadcast event may include an exchange of a plurality of data packets between the first device and the second device.

In an example, the state transition broadcast event may include an exchange of three data packets between the beacon 102 and device 106. The beacon 102 may be operating in a first state, which may be a broadcasting state. In a broadcasting state, the beacon 102 may periodically turn on to broadcast a packet that includes data indicative of the beacon 102. Further, in a broadcast state, the beacon 102 may not gather sensor data in order to conserve power. The device 106 may be scanning the wireless channel on which the beacon 102 is broadcasting the packets. Accordingly, the device 106 may receive a first data packet that is broadcast by the beacon 102. The device 106 may use from the identification data included in the payload of the packet in order to identify the beacon 102 and the state in which the beacon is operating.

In an example, the device 106 may make the determination that the beacon 102 is operating in a broadcast state. The device 106 may also make a determination that the beacon 102 should operate in a state other than a broadcast state. The determination may be based an input (e.g., from a user of the device 106) indicative of a desired state of operation of the beacon 102. Accordingly, the device 106 may generate a data packet that includes data indicative of the desired state of operation of the beacon 102. For example, the desired state of operation may be a data gathering state. In a data gathering state, the beacon 102 may use a sensor to gather sensor data. The device 106 may transmit the second data packet on the wireless channel on which the first data packet was broadcast.

The beacon 102 may be scanning the wireless channel for packets sent in response to the first data packet. Accordingly, the beacon 102 may receive the second data packet. The beacon 102 may determine the desired state of operation from the payload data of the second data packet. In response to determining the desired state of operation, the beacon 102 may change the state of operation from the first state of operation to the second state of operation. In this example, the beacon 102 may change its state of operation from a broadcast state to a data gathering state. In another example, the beacon 102 may change its state of operation from a data gathering state to a broadcast state.

The beacon 102 may also generate a third data packet. The payload of the third data packet may include data indicative of a confirmation that the state of operation has been changed. The beacon 102 may transmit the third data packet on the same wireless channel on which the first and second data packets were transmitted. The device 106 may receive the third data packet. The third data packet may be the third and final packet of the state transition event. The beacon 102 may turn off or switch to sleep mode after transmitting the third data packet.

In another embodiment, the broadcast event may be a data transfer event. A data transfer event may be used confirm receipt of data transfer from a first device to a second device. For example, the first device may be a beacon, such as beacon 102, that includes a transceiver and a sensor. The second device may be a computing device, such as device 106 or device 108. The data transfer broadcast event may include an exchange of a plurality of packets between the first device and the second device.

Consider an example where the beacon 102 includes a sensor that periodically gathers sensor data. For instance, the beacon 102 may periodically measure the temperature. The gathered sensor data may be stored in the memory of the beacon 102 as the beacon gathers the data. Further consider that the rate or frequency at which the sensor gathers data is "$f_1$." The beacon 102 may also periodically broadcast the gathered sensor data. For instance, the rate or frequency at which the sensor broadcasts the gathered sensor data is "$f_2$."

Each packet broadcast by the beacon 102 may include the most recently gathered sensor data. However, in some embodiments $f_2$ may be greater than $f_1$. In such embodiments, the beacon 102 may broadcast the same sensor data more than once. Further, as sensor data accumulates in the beacon 102's memory, data that has been gathered earlier than a certain point in time may not be included in a packet due to limited size of the packet. It may occur where data is not included in a payload of a packet although the intended receiving device (e.g., device 106) has not received the data. Thus, the device may not receive some of the data gathered by the sensor.

A confirmation broadcast event may be used to avoid the situation in which data may be lost. In a confirmation broadcast event, the beacon 102 broadcasts a first data packet. The first data packet includes a first set of sensor data. The beacon 102 periodically broadcasts the first data packet on a wireless channel. The device 106 may receive the first data packet once the device is within range and is scanning the wireless channel. The device 106 may generate and transmit a second data packet in response to receiving the first data packet. The payload of the second data packet may include data indicative of the device 106. For example, the identification data may be a serial number, a UID, or a MAC address. The second data packet may be transmitted on the same wireless on which the first data packet was transmitted.

The beacon 102 may receive the second data packet. Responsive to receiving the data packet, the beacon 102 may determine that the first data set was received by the device 106. Accordingly, in subsequent broadcasts of sensor data, the beacon 102 may drop or not include some of the data that was included in the first data set. Further, the beacon 102, in response to receiving the second data packet, may generate a third data packet that may be transmitted on the same wireless channel on which the first and second data packets were transmitted. The payload of the third data packet may include data indicative of the dropped sensor data. Additionally and/or alternatively, the payload may include a confirmation that the beacon 102 received the second data packet. The device 106 may receive the third data packet, which may be the final data packet of the broadcast event.

Figure 9:
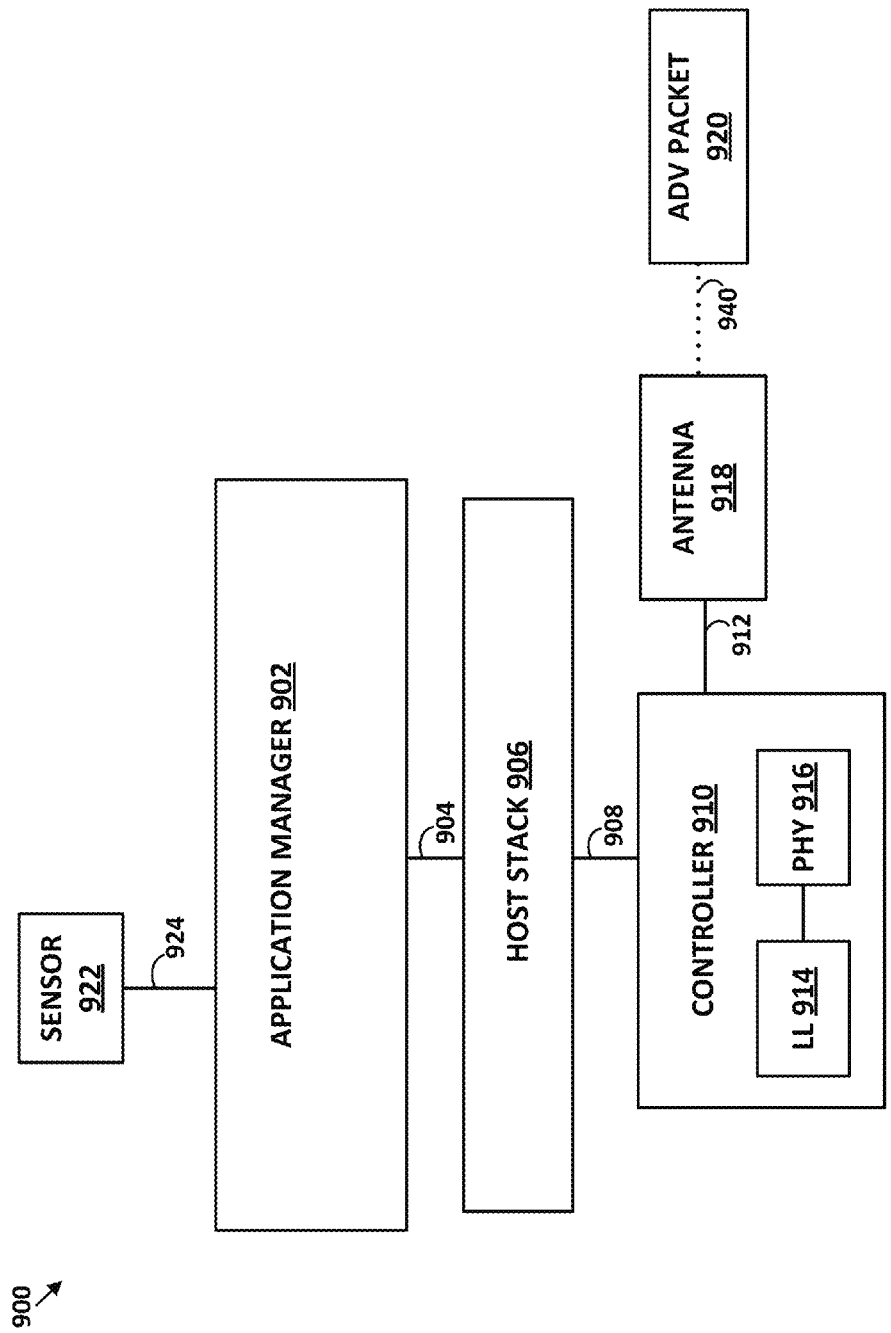
FIG. 9 is a block diagram of a Bluetooth device, in accordance with an example embodiment.

As illustrated in FIG. 9, a Bluetooth device 900, such as beacon 102, may include an application manager 902, a host stack 906, a controller 910, an antenna 918, and a sensor 922. In particular, the application manager 902 may be coupled to the host stack 906 by a system bus 904 or a similar mechanism. Further, the host stack 906 may be coupled to the controller 910 by a system bus 908 or a similar mechanism. In some embodiments, the interface between the host stack 906 and the controller 910 may be referred to as HCI. Yet further, the controller 910 may be coupled to the antenna 918 by a system bus 912 or similar mechanism.

In some examples, the application manager 902, host stack 906, and the controller 910 may be implemented on a single IC chip, which may referred to as a "system-on-chip (SOC)." Accordingly, in a SOC implementation, the three layers may be implemented simultaneously on a low power processor. In other examples, the controller 910 may be implemented on a separate processor from the host stack 906. For instance, the controller 910 may be implemented on a low power processor on a device (e.g., a BLE module), while the host stack 906 is implemented on a processor of a host computing device.

As illustrated in FIG. 9, the controller 910 may include a link layer 914 (LL) and a physical controller interface 916 (PHY). The link layer 914, which may manage the configuration of the Bluetooth device, may directly interact with the physical controller interface 916, which may include the hardware for generating a signal. The link layer 914, on the other hand, may be implemented using a combination of hardware and software. Accordingly, the physical controller interface 916 and link layer 914 may be implemented in Bluetooth device 900 using at least the BLE transmitter 200. The physical controller interface 916 and link layer 914 may also be implemented using a BLE transceiver, which may include the BLE transmitter 200.

Accordingly, in examples where the physical controller interface 916 may be implemented using at least the BLE transmitter 200, the Bluetooth device 900 may operate in an advertising mode. More specifically, the Bluetooth device 900 may broadcast advertising packets on one of the BLE advertising channels. The specific channel onto which the advertising packet may be advertised may depend on the configuration of the BLE transmitter 200. Further, the broadcast advertising packets may be scannable and undirected advertising packets. Yet further, the Bluetooth device 900 may broadcast packets that may be part of a broadcast event.

Figure 10:
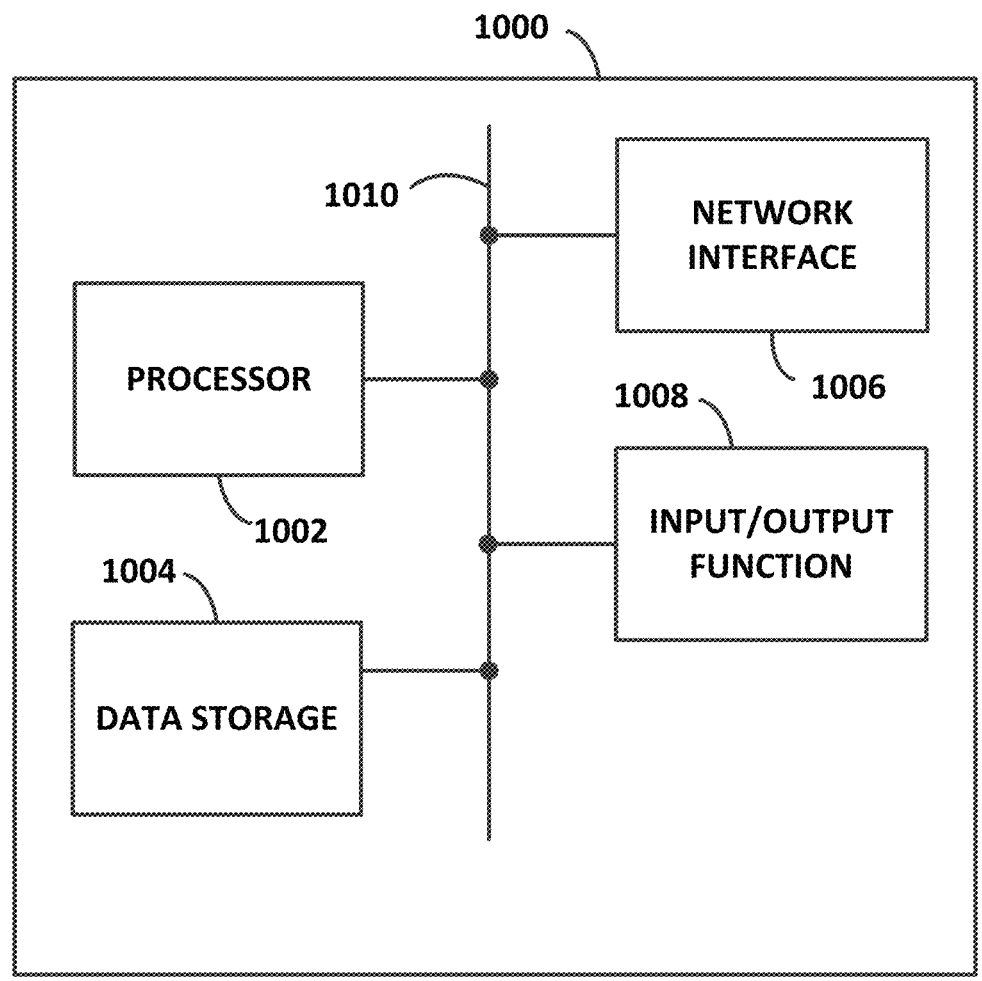
FIG. 10 is a block diagram of a computing device, in accordance with an example embodiment.

In some embodiments, the Bluetooth device 900 may be in advertising mode to broadcast an advertising packet 920 to one or more computing devices. FIG. 10 is a block diagram of an example computing device 1000. In some instances, computing device 1000 may, for example, take the form of any computing device described above in relation to FIG. 1 or a similar device that may be configured to perform the methods and functions described herein. In this example, computing device 1000 includes a processor 1002, data storage 1004, a network interface 1006, and an input/output function 1008, all of which may be coupled by a system bus 1010 or a similar mechanism. Processor 1002 can include one or more CPUs, such as one or more general purpose processors and/or one or more dedicated processors (e.g., application specific integrated circuits, digital signal processors, network processors, application processing unit, etc.).

Data storage 1004, in turn, may comprise volatile and/or non-volatile data storage and can be integrated in whole or in part with processor 1002. Data storage 1004 can hold program instructions, executable by processor 1002, and data that may be manipulated by these instructions to carry out the various methods, processes, or functions described herein. Alternatively, these methods, processes, or functions can be defined by hardware, firmware, and/or any combination of hardware, firmware, and software. By way of example, the data in data storage 1004 may contain program instructions, perhaps stored on a non-transitory, computer-readable medium, executable by processor 1002 to carry out any of the methods, processes, or functions disclosed in this specification or the accompanying drawings.

Network interface 1006 may take the form of a wireless connection, such as Bluetooth. In particular, network interface 1006 may enable one or more Bluetooth standards or protocols, including BLE protocols and related advertising protocols. For example, referring back to FIG. 1, computing device 106 may also include network interface 1006 to pair with computing device 108. In addition, the network interface 1006 may include a transceiver. A transmitter can transmit radio waves carrying data and a receiver can receive radio waves carrying data. A transceiver with that transmitter and receiver can include one or more antennas and can be referred to as a "radio unit," an "RF transceiver," or a "wireless transceiver." In addition, network interface 1006 may take the form of other wireless connections, such as IEEE 802.11 (Wi-Fi), or a wide-area wireless connection.

However, other forms of physical layer connections and other types of standard or proprietary communication protocols may be used over network interface 1006. Furthermore, network interface 1006 may comprise multiple physical interfaces. Further, network interface 1006 may take the form of a wireline connection, such as an Ethernet connection.

Input/output function 1008 may facilitate user interaction with example computing device 1000. Input/output function 1008 may comprise multiple types of input devices, such as a keyboard, a mouse, a touch screen, and so on. Similarly, input/output function 1008 may comprise multiple types of output devices, such as a screen, monitor, printer, or one or more light emitting diodes (LEDs). Additionally or alternatively, example computing device 1000 may support remote access from another device, via network interface 1006 or via another interface (not shown), such as a universal serial bus (USB) or high-definition multimedia interface (HDMI) port.

In some embodiments, the computing device 1000 may include a device platform or operating system (not shown). In some instances, the device platform or the operating system may be compatible with Bluetooth, Bluetooth Low Energy (BLE) protocols, and/or BLE advertising protocols. In some instances, the device platform or the operating system may be configured as a multi-layered Linux platform or operating system. The device platform may include different applications and an application framework, as well as various kernels, libraries, and runtime entities. In other examples, other formats or systems may operate the computing device 1000 as well.

Accordingly, Bluetooth device 900 may transmit advertising packet 920 which may be received by computing device 1000. In particular, an application may be downloaded on Bluetooth device 900 or on a computing device combined with Bluetooth device 900. Further, the application may exchange advertisement data with application manager 902 through an application interface. Yet further, the applications may communicate with application manager 902 to transmit the advertisement packet 920 to other devices (not shown in FIG. 9), such as computing device 1000.

In some embodiments, Bluetooth device 900 may enter advertisement mode to transmit an advertising packet over the air for one or more applications. In some examples, the application of the Bluetooth device 900 may be predetermined. For instance, the Bluetooth device 900 may be a location beacon. In an example, the Bluetooth beacon 900 may be located inside of a building (e.g., an office building, store, etc.). Further, a computing device 1000 may be located in proximity to the Bluetooth beacon 900. When the Bluetooth beacon 900 transmits advertising packets, it may transmit the advertising packet with location data. Depending on the specific embodiment, the location data can take many different forms. For example, the Bluetooth beacon 900 may be configured to provide data related to a location of the respective Bluetooth beacon either via relative position information or geographic coordinate system data. In another example, the Bluetooth beacon 900 may provide the computing device 1000 with global location data.

These reference advertisement packets may correspond to a location that is known by the computing device 1000, such as the entrance to a building. In other embodiments, the computing device 1000 may receive data wirelessly including a set of reference advertisement packets. For example, when entering a building, the Bluetooth beacon 900 may communicate a set of data that relates to reference advertisement packets that the computing device 1000 can expect to receive when stepping foot inside the store.

In another example, the Bluetooth device 900 may include a sensor 922. As illustrated, the sensor 922 may exchange data with the application manager 902 through the application interface 924. For instance, the Bluetooth device 900 may broadcast advertising packets, which may include data collected by the sensor 922, which the application manager 902 may receive through the application interface 924. For instance, the Bluetooth device 900 may be a body-mountable device configured to be mounted to a skin surface (e.g., to skin of the upper arm or abdomen of a person), with one or more sensors for quantitatively and qualitatively testing an analyte concentration in interstitial fluid (e.g., glucose in interstitial fluid) in situ and in real-time. Those of skill in the art will recognize that the sensing platform described herein may be provided in devices that could be mounted on a variety of portions of the human body to measure concentrations of an analyte in other fluids than interstitial fluid (e.g., to measure an analyte in a tear fluid, blood, saliva, or some other fluid or tissue of the body). Accordingly, the Bluetooth device 900 may be used for monitoring or detecting a user's health state. Further, the Bluetooth device 900 may broadcast sensor readings to a user's computing device 1000.

In another example, the Bluetooth device 900 may exchange packets with the computing device 1000. For instance, the Bluetooth device 900 may broadcast a broadcasting event such as encrypted data transfer. For example, the Bluetooth device 900 may be a body-mountable device that includes a sensor. The Bluetooth device 900 may broadcast an encrypted data transfer event in order to encrypt the body-mountable device sensor data and transfer the encrypted data to a user's computing device 1000. The Bluetooth device 900 may also be programmed to broadcast other events such as a data transfer event and a state transition event.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system comprising:
   a sensor;
   a transceiver coupled to the sensor, the transceiver comprising:
      an oscillator circuit comprising a thin-film bulk acoustic resonator (FBAR) configured to generate an RF signal;
      a prescaler generating a clock signal based on the RF signal;
      a packetizer using the clock signal to generate a data signal comprising one or more data packets, wherein the data signal is used to directly modulate the RF signal; and
      an antenna configured to broadcast the one or more data packets by broadcasting the modulated RF signal;
   a controller comprising a processor programmed to:
      broadcast, by the antenna, a first data packet on a wireless channel, wherein the first data packet is a first packet of a broadcast event;
      receive, at the antenna, a second data packet transmitted on the wireless channel, wherein the second data packet is a second packet of the broadcast event;
      responsive to receiving the second data packet, perform an action associated with the broadcast event; and
      responsive to the action, transmit, by the antenna, a third data packet on the wireless channel, wherein the third data packet is a third packet of the broadcast event.

2. The system of claim 1, wherein the broadcast event is an encrypted data transfer event, wherein a payload of the first data packet comprises encrypted data indicative of a first response, and wherein a payload of the second data packet comprises a second response.

3. The system of claim 2, wherein the processor programmed to perform the action associated with the broadcast event comprises the processor programmed to determine that the second response matches the first response.

4. The system of claim 3, wherein a payload of the third data packet comprises encrypted sensor data.

5. The system of claim 1, wherein the broadcast event is a state transition broadcast event, wherein a payload of the first data packet comprises data indicative of a first state of operation of the sensor, and wherein a payload of the second data packet comprises data indicative of a second state of operation of the sensor.

6. The system of claim 5, wherein the processor programmed to perform the action associated with the broadcast event comprises the processor programmed to change the state of operation of the sensor from the first state to the second state.

7. The system of claim 6, wherein the first state is a broadcasting state, and wherein the second state is a data gathering state.

8. The system of claim 7, wherein a payload of the third data packet comprises sensor data gathered by the sensor operating in the data gathering state.

9. The system of claim 6, wherein the first state is a data gathering state, and wherein the second state is a broadcasting state.

10. The system of claim 1, wherein the broadcast event is a data transfer event, wherein a payload of the first data packet comprises sensor data, and wherein the second data packet is transmitted by a radio unit of a device.

11. The system of claim 10, wherein the processor programmed to perform the action associated with the broadcast event comprises the processor programmed to (i) determine receipt of the first data packet by the radio unit of the device and (ii) responsive to determining the receipt, deleting a portion of stored sensor data.

12. The system of claim 1, wherein the oscillator circuit is a Pierce oscillator circuit.

13. The system of claim 1, wherein the data packets are based on a Bluetooth Low Energy (BLE) protocol, wherein the broadcast event is an advertisement event, and wherein the wireless channel is an advertisement channel.

14. A method comprising:
   broadcasting on a wireless channel, by an antenna of a transceiver, a first data packet of a broadcast event, wherein the transceiver comprises:
      an oscillator circuit comprising a thin-film bulk acoustic resonator (FBAR) configured to generate an RF signal,
      a prescaler generating a clock signal based on the RF signal; and
      a packetizer using the clock signal to generate a data signal comprising the first data packet, wherein the data signal is used to directly modulate the RF signal;

receiving, at the antenna of the transceiver, a second data packet transmitted on the wireless channel, wherein the second data packet is a second packet of the broadcast event;

responsive to receiving the second data packet, performing an action associated with the broadcast event; and based on the action, transmitting, by the antenna, a third data packet on the wireless channel, wherein the third data packet is a third packet of the broadcast event.

15. The method of claim 14, wherein the broadcast event is an encrypted data transfer event, wherein a payload of the first data packet comprises encrypted data indicative of a first response, and wherein a payload of the second data packet comprises a second response.

16. The method of claim 15, performing the action associated with the broadcast event comprises determining that the second response matches the first response, and wherein a payload of the third data packet comprises encrypted sensor data.

17. The method of claim 14, wherein the broadcast event is a state transition broadcast event, wherein a payload of the first data packet comprises data indicative of a first state of operation of a sensor, and wherein a payload of the second data packet comprises data indicative of a second state of operation of the sensor.

18. The method of claim 17, wherein performing the action associated broadcast event comprises changing the state of operation of the sensor from the first state to the second state.

19. The method of claim 18, wherein the first state is a broadcasting state, and wherein the second state is a data gathering state, and wherein the third data packet comprises sensor data gathered by the sensor operating in the data gathering state.

20. A system comprising:
a transceiver coupled to a sensor, the transceiver comprising:
at least one Pierce oscillator circuit comprising a thin-film bulk acoustic resonator (FBAR), wherein the at least one Pierce oscillator circuit is configured to generate an RF signal;
a prescaler generating a clock signal based on the RF signal;
a packetizer using the clock signal to generate a data signal comprising one or more data packets, wherein the data signal is used to directly modulate the RF signal; and
an antenna configured to broadcast the one or more data packets by broadcasting the modulated RF signal;
a controller comprising a processor programmed to:
broadcast, by the antenna, a first data packet on at least one wireless channel, wherein the first data packet is a first packet of a broadcast event;
receive, at the antenna, a second data packet transmitted on the at least one wireless channel, wherein the second data packet is a second packet of the broadcast event;
responsive to receiving the second data packet, perform an action associated with the broadcast event; and
responsive to the action, transmit, by the antenna, a third data packet on the at least wireless channel, wherein the third data packet is a third packet of the broadcast event.

* * * * *